(12) United States Patent
Tanaka

(10) Patent No.: US 8,504,928 B2
(45) Date of Patent: Aug. 6, 2013

(54) COMMUNICATION TERMINAL, DISPLAY CONTROL METHOD, AND COMPUTER-READABLE MEDIUM STORING DISPLAY CONTROL PROGRAM

(75) Inventor: Akifumi Tanaka, Handa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 342 days.

(21) Appl. No.: 12/659,223

(22) Filed: Mar. 1, 2010

(65) Prior Publication Data

US 2010/0226546 A1 Sep. 9, 2010

(30) Foreign Application Priority Data

Mar. 6, 2009 (JP) ................................. 2009-052847

(51) Int. Cl.
*G06F 3/14* (2006.01)
(52) U.S. Cl.
USPC ........... 715/753; 345/473; 345/629; 382/118; 382/190; 705/3
(58) Field of Classification Search
USPC .......... 715/200–277, 700–867; 700/701–866; 709/201–229; 705/3, 50–79; 345/30–111, 345/473, 629; 707/200–206; 382/118, 190
See application file for complete search history.

(56) References Cited

U.S. PATENT DOCUMENTS

| | | | | |
|---|---|---|---|---|
| 2008/0298643 | A1* | 12/2008 | Lawther et al. | 382/118 |
| 2010/0007665 | A1* | 1/2010 | Smith et al. | 345/473 |
| 2010/0030578 | A1* | 2/2010 | Siddique et al. | 705/3 |
| 2010/0158380 | A1* | 6/2010 | Neville et al. | 382/190 |
| 2011/0025709 | A1* | 2/2011 | Ptucha et al. | 345/629 |

FOREIGN PATENT DOCUMENTS

JP A-10-164541 6/1998

* cited by examiner

*Primary Examiner* — Ruay Ho
(74) *Attorney, Agent, or Firm* — Oliff & Berridge, PLC

(57) ABSTRACT

A communication terminal displays images on a display device. The communication terminal: receives a material image and corresponding first identification information transmitted from a communication terminal via a network; receives a captured image and corresponding second identification information transmitted from a second communication terminal via the network, the captured image being captured by a camera; compares the first identification information with the second identification information; and displays, when the result of the comparing indicates that the first identification information and the second identification information are the same, the material image and the captured image on a display device in such a manner that at least a part of the captured image overlaps with at least a part of the material image or in such a manner that an outer edge of the part of the captured image abuts an outer edge of the material image.

12 Claims, 16 Drawing Sheets

| USER ID | TERMINAL ID |
|---------|-------------|
| A0001   | 0001        |
| B0001   | 0002        |
| C0001   | 0003        |
| D0001   | 0004        |
| ⋮       | ⋮           |

3121

| FILE NAME | TYPE | TERMINAL ID | ACTIVE FLAG |
|---|---|---|---|
| AAAA.doc | MATERIAL IMAGE | 0004 | OFF |
| BBBB.ppt | MATERIAL IMAGE | 0003 | OFF |
| CCCC.cif | CAPTURED IMAGE | 0004 | OFF |
| DDDD.ppt | MATERIAL IMAGE | 0002 | ON |
| EEEE.doc | MATERIAL IMAGE | 0002 | ON |
| FFFF.cif | CAPTURED IMAGE | 0002 | ON |
| : | : | : | : |

COMMUNICATION TERMINAL, DISPLAY CONTROL METHOD, AND COMPUTER-READABLE MEDIUM STORING DISPLAY CONTROL PROGRAM

CROSS-REFERENCE TO RELATED APPLICATION

This application claims priority to Japanese Patent Application No. 2009-052847, filed Mar. 6, 2009, the disclosure of which is hereby incorporated by reference in its entirety.

BACKGROUND

The present disclosure relates to a communication terminal that displays a plurality of display images received from another communication terminal on a common display area, a display control method, and a computer-readable medium storing a display control program.

There are provided a video conference terminal and a video conference system for simultaneously displaying on a display a plurality of display images (for example, a speaker's image and an explanatory material, or a plurality of explanatory materials) received from one terminal. A user of the video conference terminal can deliver presentations to users of other video conference terminals with reference to the explanatory materials. The user of the video conference terminal can allow the other users to simultaneously view a plurality of explanatory materials.

The above video conference terminal simultaneously receives a plurality of display images from a plurality of terminals. In this case, the video conference terminal displays all the received display images on a display. The users who view the display cannot associate the display images transmitted from the same terminal with each other. On the contrary, there is provided a video conference system, which adds identification information for identifying a terminal to display images transmitted from the terminal so as to display them on the display. The video conference system can clearly specify the terminal that has transmitted the display images.

SUMMARY

By recognizing the identification information added to the display images, the user of the above video conference system may needs to associate the display images transmitted from the same terminal with each other. The user, therefore, cannot easily recognize the display images transmitted from the same terminal by associating them to each other at first glance.

It is an object of the present disclosure to provide a communication terminal that allows a user to easily recognize display images transmitted from one terminal by relating them to each other, a display control method, and a computer-readable medium storing a display control program.

Exemplary embodiments provide a communication terminal connectable to a network for achieving communication via the network, comprising: a receiving control device that receives a display image and identification information transmitted from another communication terminal via the network, the display image being an image to be displayed on a display device, and the identification information being information for identifying the other communication terminal; a first display control device that displays on the display device the display image received by the receiving control device; a determining device that determines whether or not the display image is currently displayed on the display device; a first identifying device that, when the determining device determines that the display image is currently displayed on the display device, identifies a currently displayed image and the identification information of the other communication terminal that has transmitted the currently displayed image, the currently displayed image being the display image that is currently displayed on the display device; and a second display control device that, when the receiving control device receives the identification information and a predetermined image as the display image, and when the received identification information matches with the identification information identified by the first identifying device, displays at least a partial image of the received predetermined image in such a manner that the at least partial image overlaps with at least a part of a display area of the currently displayed image, or in such a manner that a display frame of the at least partial image contacts with a display frame of the display area of the currently displayed image.

Exemplary embodiments also provide a display control method to be performed in a communication terminal connectable with a network, comprising: a receiving control step that receives a display image and identification information transmitted from another communication terminal via the network, the display image being an image to be displayed on a display device, and the identification information being information for identifying the other communication terminal; a first display control step that displays on the display device the display image received by the receiving control step; a determining step that determines whether or not the display image is currently displayed on the display device; a first identifying step that, when the determining step determines that the display image is currently displayed on the display device, identifies a currently displayed image and the identification information of the other communication terminal that has transmitted the currently displayed image, the currently displayed image being the display image that is currently displayed on the display device; and a second display control step that, when the receiving control step receives the identification information and a predetermined image as the display image, and when the received identification information matches with the identification information identified by the first identifying step, displays at least a partial image of the received predetermined image in such a manner that the at least partial image overlaps with at least a part of a display area of the currently displayed image, or in such a manner that a display frame of the at least partial image contacts with a display frame of the display area of the currently displayed image.

Exemplary embodiments further provide a computer-readable medium storing a display control program of a communication terminal, the display control program to be executed by the computer of the communication terminal, comprising: a receiving control step that receives a display image and identification information transmitted from another communication terminal via the network, the display image being an image to be displayed on a display device, and the identification information being information for identifying the other communication terminal; a first display control step that displays on the display device the display image received by the receiving control step; a determining step that determines whether or not the display image is currently displayed on the display device; a first identifying step that, when the determining step determines that the display image is currently displayed on the display device, identifies a currently displayed image and the identification information of the other communication terminal that has transmitted the currently displayed image, the currently displayed image being the display image that is currently displayed on the display device; and a second display control step that, when the receiving control step receives the identification information and a predetermined image as the display image, and when the received identification information matches with the identification information identified by the first identifying step, displays at least a partial image of the received predetermined image in such a manner that the at least partial image overlaps with at least a part of a display area of the currently displayed image, or in such a manner that a display frame of the at least partial image contacts with a display frame of the display area of the currently displayed image.

BRIEF DESCRIPTION OF THE DRAWINGS

Exemplary embodiments of the disclosure will be described below in detail with reference to the accompanying drawings in which:

FIG. 4 is a pattern diagram illustrating a log-in table;

DETAILED DESCRIPTION OF THE EXEMPLARY EMBODIMENTS

Figure 1:
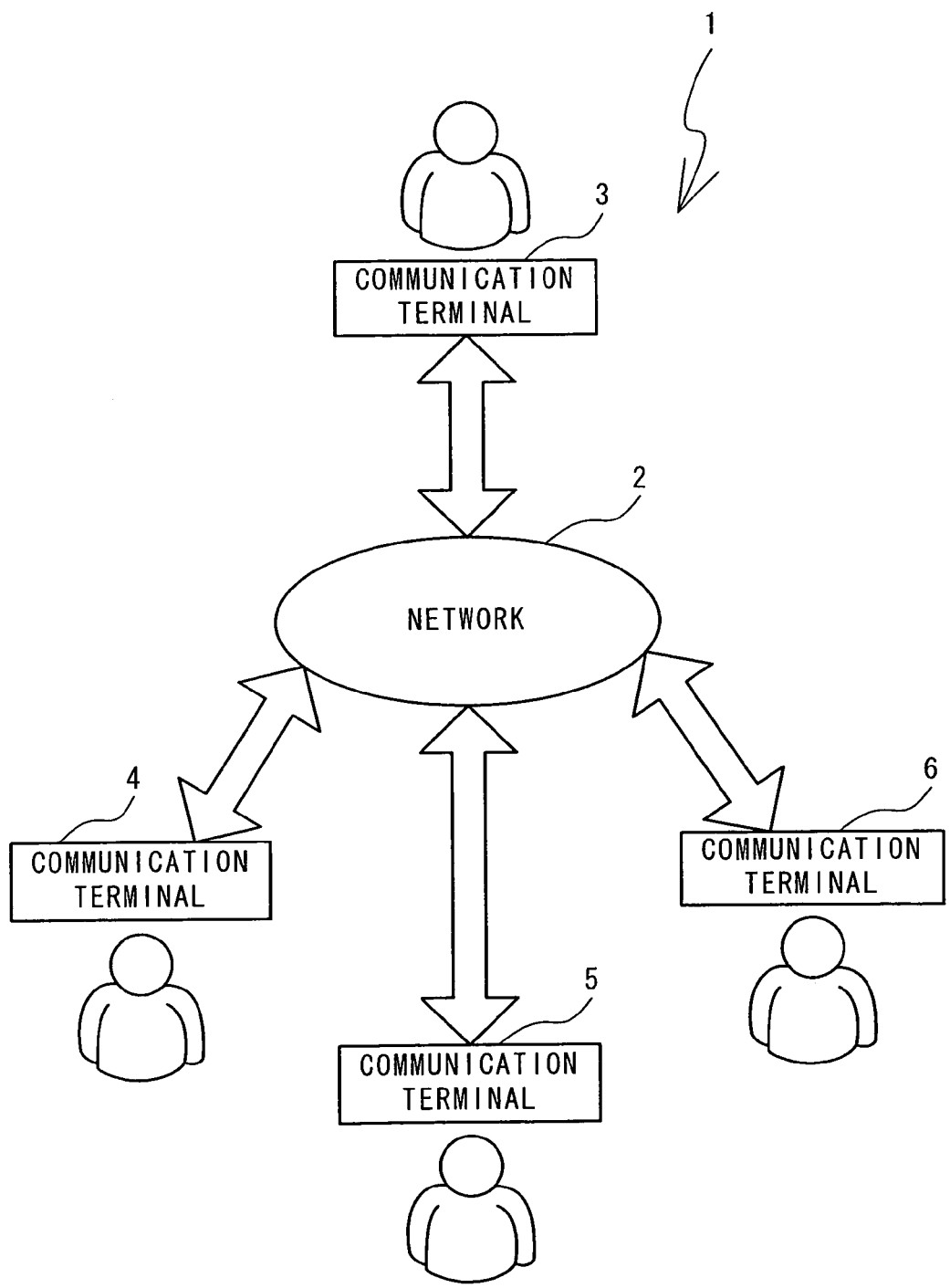
FIG. 1 is a pattern diagram illustrating a constitution of a video conference system.

One embodiment of communication terminals 3 to 6 obtained by embodying the communication terminal of the present disclosure will be described below with reference to the drawings. The drawings are used for describing technical characteristics that may be adopted. Configurations of the devices and flowcharts of various processes illustrated in the drawings are simply explanatory examples.

A description will be given of a configuration of a video conference system 1 that includes having the communication terminals 3 to 6 with reference to FIG. 1. The video conference system 1 includes a network 2, and the communication terminals 3, 4, 5, and 6. The communication terminals 3 to 6 are connected with each other via the network 2. The communication terminals 3 to 6 are provided at respective locations. The communication terminals 3 to 6 transmit/receive images and sounds to/from each other via the network 2. Thus, video conference can be held.

A person who desires to participate in the video conference operates any one of the communication terminals 3 to 6, and inputs identification (ID) information. The communication terminal into which ID information is input (communication terminal 3) logs in the video conference. In the video conference logged-in state, a camera 34 (see FIG. 2) connected to the communication terminal 3 captures an image of the participant of the conference. The captured image by the camera 34 (hereinafter "captured image") is transmitted from the communication terminal 3 to the communication terminals 4 to 6. An image of a material to be referenced by the participants of the video conference (hereinafter "material image") may be transmitted from the communication terminal 3 to the communication terminals 4 to 6 as necessary.

The communication terminals 4 to 6 receive the captured image and/or the material image (hereinafter, collectively called "display image"). The communication terminals 4 to 6 display the received display image on a display 28. When a plurality of display images is received, the communication terminals 4 to 6 display the respective display images on windows. Thus, the participant of the conference can allow the other participants to view the image of his/her own and the material image referenced by him/her.

For example, captured images and material images are transmitted simultaneously from the communication terminals 4 to 6 to the communication terminal 3. Then the captured images of the participants operating the communication terminals 4 to 6 respectively and the plurality of material images referenced by the participants are displayed together on the display 28 of the communication terminal 3. The participant who operates the communication terminal 3 may have difficulty in identifying who referres to the respective material images displayed on the display 28. In this embodiment, when the communication terminal displays display images on the display 28, the captured image is displayed in a manner that it is overlapped with the material image referenced by the participant of the captured image. Therefore, the participant can easily identify who refers to the respective material images displayed on the display 28.

In the above description, people who desire to take part in a video conference respectively input ID information into the communication terminals 3 to 6, so as to log in the video conference. However, other various log-in methods can be used. For example, a method which allows a reader to read RFID (radio frequency identification) so as to log in the video conference may be employed.

Figure 2:
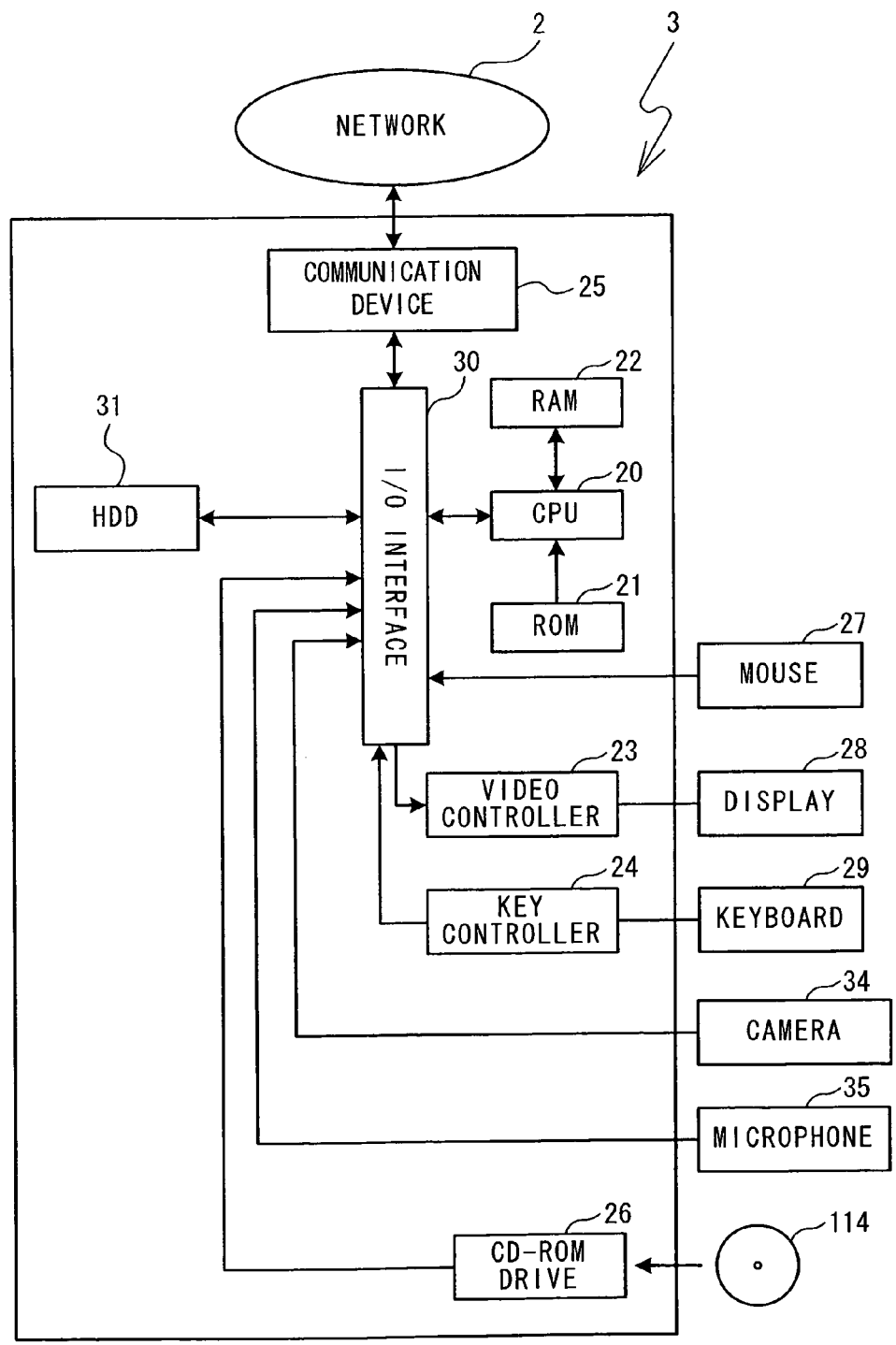
FIG. 2 is a block diagram illustrating an electrical configuration of a communication terminal.

An electrical configuration of the communication terminal 3 will be described with reference to FIG. 2. All the communication terminals 3 to 6 have the same configuration. Therefore, only the configuration of the communication terminal 3 is described. The description of the electrical configurations of the communication terminals 4 to 6 is omitted.

The communication terminal 3 includes a CPU 20, a ROM 21, a RAM 22, an I/O interface 30, and a hard disc drive 31 (hereinafter, "HDD 31"). The CPU 20 is a controller that controls the communication terminal 3. The ROM 21 stores BIOS or the like. The RAM 22 temporarily stores various data. The I/O interface 30 mediates transmission/reception of data. The HDD 31 has various storage areas. The CPU 20 is connected to the ROM 21, the RAM 22, and the I/O interface 30. The I/O interface 30 is connected to the HDD 31.

The communication terminal 3 also includes a communication device 25, a mouse 27, a video controller 23, a key controller 24, a camera 34, a microphone 35, and a CD-ROM drive 26. The communication device 25 makes communication via the network 2. The camera 34 captures images of a participant. The microphone 35 captures sounds of the participant. The I/O interface 30 is connected to the communication device 25, the mouse 27, the video controller 23, the key controller 24, the camera 34, the microphone 35, and the CD-ROM drive 26. The video controller 23 is connected to the display 28. The key controller 24 is connected to the keyboard 29. A CD-ROM 114 can be inserted into the CD-ROM drive 26. A main program, a communication control program and the like of the communication terminal 3 are stored in the CD-ROM 114. When the programs are introduced, the various programs may be loaded from the CD-ROM 114. The various programs are stored in a program storage area 314 (see FIG. 3) of the HDD 31.

Figure 3:
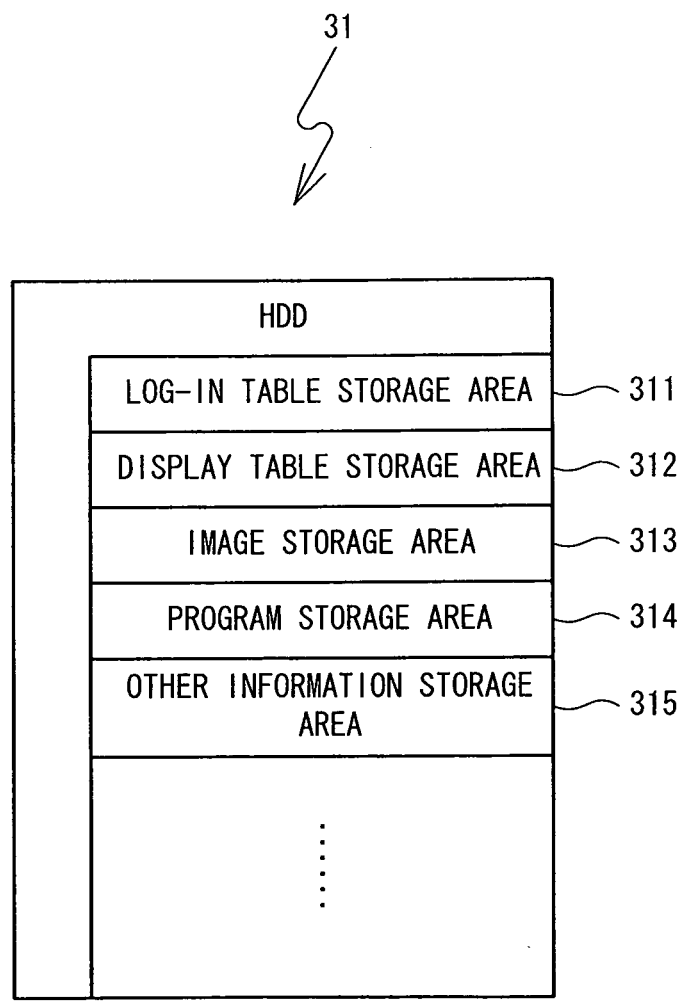
FIG. 3 is a pattern diagram illustrating a storage area of HDD.

The various storage areas of the HDD 31 are described with reference to FIG. 3. The HDD 31 is provided with at least a log-in table storage area 311, a display table storage area 312, an image storage area 313, a program storage area 314, and other information storage area 315.

A log-in table 3111 (see FIG. 4) is stored in the log-in table storage area 311. The log-in table 3111 manages the participants as users who have logged in the video conference. A display table 3121 (see FIG. 5) is stored in the display table storage area 312. The display table 3121 stores information relating to a display image that is currently displayed on the display 28 (hereinafter "currently displayed information") therein. The captured image and/or the material image are stored in the image storage area 313. The main program of the communication terminal 3 is stored in the program storage area 314. The communication control program or the like for carrying out video conference among the communication terminals 4 to 6 is stored in the program storage area 314. Other information to be used in the communication terminal 3 is stored in the other information storage area 315. In a case where the communication terminal 3 is adidicated device that does not have the HDD 31, the various programs may be stored in the ROM 21.

The log-in table 3111 will be described with reference to FIG. 4. User IDs of the participants of the video conference who have logged in the video conference are stored in the log-in table 3111. Terminal ID of the communication terminal 3 used by the participant is stored in the log-in table 3111 in association with the user ID.

The ID information input via the keyboard 29 at the time of log-in is stored as the user ID. Identification information for identifying the communication terminals 3 to 6 is stored as the terminal IDs. For example, a MAC address or an IP address can be used as the terminal ID. The user IDs and the terminal IDs are included in the terminal information transmitted from the communication terminals 4 to 6 at the time of logging in the video conference. The communication terminal 3 receives the terminal information from the communication terminals 4 to 6 in a state where the terminal 3 is logging in the video conference. When the communication terminal 3 receives the terminal information, the communication terminal 3 extracts the user ID and the terminal ID included in the terminal information. The extracted user ID and terminal ID are stored in the log-in table 3111.

FIG. 4 illustrates the log-in table 3111 in the case where four people participate in the video conference. The people who participate in the video conference include a person specified by a user ID "A0001" (terminal ID: 0001), a person specified by a user ID "B0001" (terminal ID: 0002), a person specified by a user ID "C0001" (terminal ID: 0003), and a person specified by a user ID "D0001" (terminal ID: 0004). The communication terminal specified by the terminal ID 0001 corresponds to the communication terminal 3 (see FIG. 1). The communication terminal specified by the terminal ID 0002 corresponds to the communication terminal 4 (see FIG. 1). The communication terminal specified by the terminal ID 0003 corresponds to the communication terminal 5 (see FIG. 1). The communication terminal specified by the terminal ID 0004 corresponds to the communication terminal 6 (see FIG. 1).

A display table 3121 will be described with reference to FIG. 5. The display table 3121 stores file names, types, terminal IDs, and active flags. The File name represents a file name of display image displayed on the display 28. The Type represents a type of the display image. The Terminal ID represents a terminal ID of one of the communication terminals 4 to 6 having transmitted the display image. The Active flag represents whether or not the display image displayed on the display 28 is a target of an input or an operation by a user. When the communication terminal 3 receives the display image from any one of the communication terminals 4 to 6, the communication terminal 3 stores the above information in the display table 3121. When the display images are displayed on the display 28, the communication terminal 3 refers to the display table 3121.

The Type represents whether or not the display image is captured images or a material image. The Active flag is turned "ON" when the display image is the target of an input or an operation by a user (Hereinafter a state in which the display image is the target of any input or an operation by the use will reffered to as "an active state"). The Active flag is turned "OFF" when the display image is not the target (Hereinafter a state in which the display image is not the target of any input or an operation by the use will reffered to as "a non-active state").

Figure 5:
FIG. 5 is a pattern diagram illustrating a display table.

As shown in FIG. 5, the communication terminal 3 has received files whose file names are "AAAA.doc" (material image) and "CCCC.cif" (captured image) from the communication terminal 6 whose terminal ID is "0004", and the information is stored in the display table 3121. The communication terminal 3 displays the received files on the display 28. The display images are non-active. The communication terminal 3 receives files whose file names are "DDDD.ppt" (material image), "EEEE.doc" (material image) and "FFFF.cif" (captured image) from the communication terminal 4 whose terminal ID is "0002". The communication terminal 3 displays the received files on the display 28. The display images are active.

Various processes (image transmitting process, image receiving process, active display process, and changing process) to be executed by the communication terminal 3 will be described with reference to FIGS. 6 to 11. A user operates the communication terminal 3 to log in the video conference. The user activates an application for carrying out the video conference. The various processes are activated and executed by the CPU 20 when the application is activated. The various processes are suitably switched to be executed based on predetermined cycles or preset priorities of the respective processes. This may prevent a problem that specific processes are continuously executed and the other processes are not executed. When any one of the processes is being executed and another process needs to be executed, the ongoing process is suspended. The other process is executed instead. The suspended process is restarted from the suspended step at a next executing timing.

The image transmitting process will be described with reference to FIG. 6. The communication terminal 3 which has logged in the video conference transmits the captured image and the material image to the communication terminals 4 to 6 according to the image transmitting process.

Figure 6:
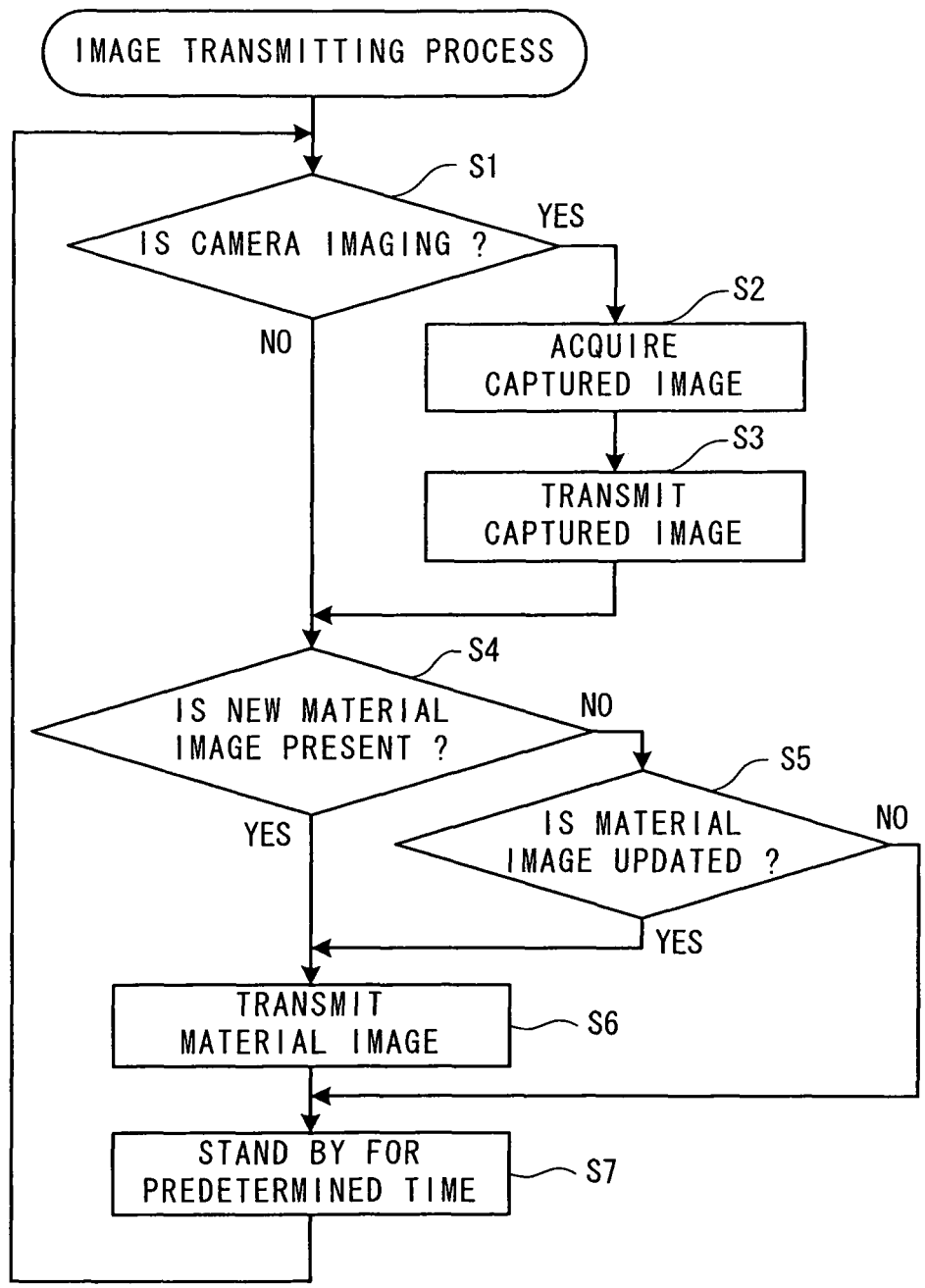
FIG. 6 is a flowchart illustrating an image transmitting process.

As shown in FIG. 6, when the image transmitting process is activated, a determination is made whether or not the camera 34 has captured an image of the participant (S1). When the camera 34 has not captured an image of the participant (NO at S1), the sequence goes to step S4 without executing any particular process.

When the camera 34 captures an image of the participant (YES at S1), the captured image is acquired (S2). Reference is made to the log-in table 3111 stored in the log-in table storage area 311. The communication terminals 4 to 6 that have logged in the video conference are identified. The acquired captured image and the terminal ID of the communication terminal 3 are transmitted to the communication terminals 4 to 6 (S3). The sequence then goes to step S4.

A determination is made at step S4 whether or not an operation for displaying a new material image on the displays 28 of the communication terminals 4 to 6 is performed by the participants via the keyboards 29 of the communication terminal 3 (S4). When the operation for displaying the new material image is performed (YES at S4), the material image to be displayed is selected by the participants. The selected material image is transmitted to the communication terminals 4 to 6 (S6). The sequence then goes to step S7.

When the operation for displaying the new material image is not performed (NO at S4), a determination is made whether or not an operation for updating the material image displayed on the displays 28 of the communication terminals 4 to 6 (page scrolling and the like) is performed via the keyboards 29 of the communication terminal 3 (S5). When the operation for updating the material image is performed (YES at S5), the updated material image is transmitted to the communication terminals 4 to 6 (S6). The sequence then goes to step S7. When the operation for) updating the material image is not performed (NO at S5), the sequence goes to step S7 without executing any particular process.

The sequence is in a stand-by state for a predetermined time (for example, 1 ms) in order to adjust the process executing time (S7). The sequence then returns to step S1, so as to repeat the above process. As a result, when the camera 34 is continuously capturing images, the captured images are sequentially transmitted to the communication terminals 4 to 6 at predetermined cycles.

The image receiving process will be described with reference to FIGS. 7 and 8. The communication terminal 3 receives the display image (captured image or material image) transmitted from the communication terminals 4 to 6 according to the image receiving process. The communication terminal 3 displays the received display images on the display 28.

Figure 7:
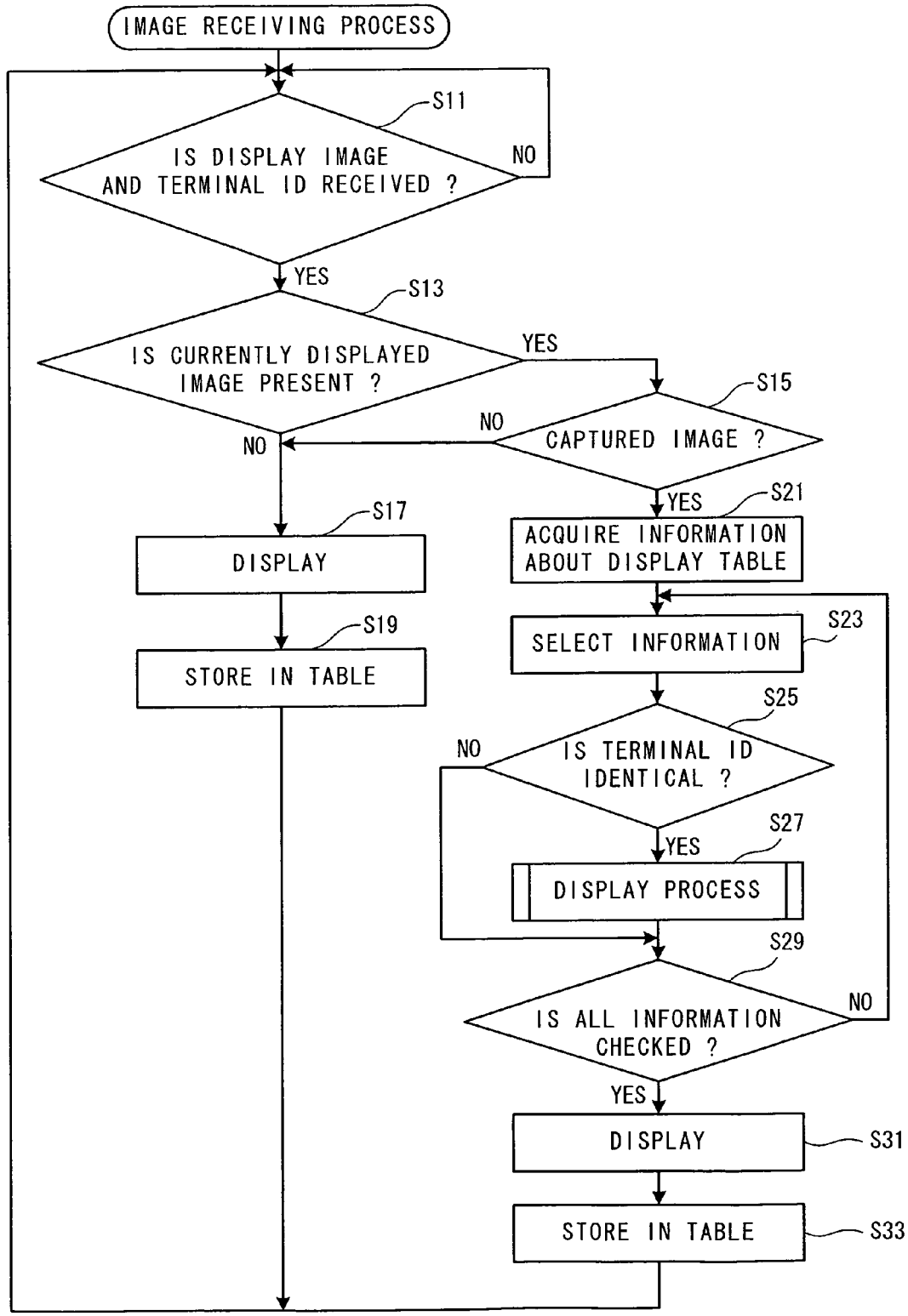
FIG. 7 is a flowchart illustrating an image receiving process.
Figure 8:
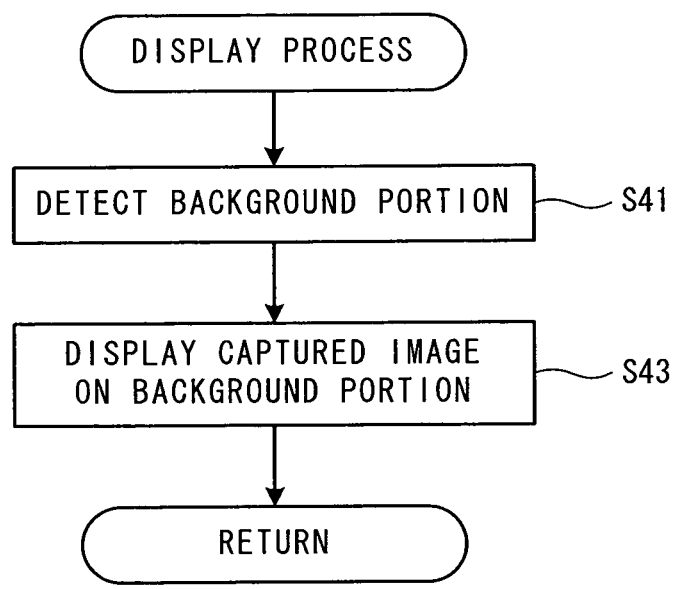
FIG. 8 is a flowchart illustrating a display process.

As shown in FIG. 7, when the image receiving process is activated, a determination is made whether or not the display image and the terminal ID are received from any one of the communication terminals 4 to 6 via the network 2 (S11). When the display image and the terminal ID are not received (NO at S11), the sequence returns to step S11. The reception of the display image and the terminal ID is continuously monitored.

When the display image and the terminal ID are received from any one of the communication terminals 4 to 6 (YES at S11), the received display image is stored in the image storage area 313. The display table 3121 is referred to. A determination is made whether or not the display image is being displayed on the display 28 (S13). When the currently displayed information is not stored in the display table 3121, the display image is not displayed on the display 28 (NO at S13). The received display image is displayed on the display 28 (S17).

The information and the terminal ID relating to the received display image is stored in the display table 3121 (S19) as the currently displayed information. Specifically, the following process is executed. The file name of the received display image is stored. When file extension of the received display image is extension of the captured image (for example, ".cif"), the type representing the captured image is stored. When the file extension of the received display image is an extension of a material (for example, ".doc" and ".ppt"), the type representing the material image is stored. The received terminal ID is stored. The active flag is stored as OFF. The sequence returns to step S11 so as to repeat the above process.

If the currently displayed information is stored in the display table 3121, the display image is currently displayed on the display 28 (YES at S13). A determination is made whether or not the received display image is the captured image (S15). When file extension of the received display image is not an extension of the captured image (NO at S15), the received display image is the material image. The received material image is displayed on the display 28 (S17). The information and the terminal ID relating to the received material image is stored in the display table 3121 (S19). The sequence returns to step S11 so as to repeat the above process.

A display position on the display 28 where the material image is displayed is not particularly limited. For example, the newly received material image may be displayed in a position such that the newly received material does not overlap with the another material image displayed on the display 28. The newly received material image may be displayed so as to overlap with the another material image displayed on the display 28. When the newly received material image is displayed in the overlapping manner, both of the images may be displayed in a completely overlapping manner. Both of the images may be displayed in a partially overlapping manner.

When a material image whose file name is identical to the material image displayed on the display 28 is newly received that is, when information about the file name identical to the file name of the received material image is already stored in the display table 3121, the displayed material image is updated by the received material image (S17). The information and the terminal ID relating to the received material image are written over the currently displayed information about the material image stored in the display table 3121 (S19). The sequence returns to step S11 so as to repeat the above process.

When the file extension of the received display image is the file extension of the captured image (YES at S15), the captured image is received. The received captured image is displayed so as to partially overlap with the material image as necessary. Reference is made to the currently displayed information related to the material image stored in the display table 3121 (S21). One piece of currently displayed information is selected (S23). The received terminal ID is compared with the terminal ID of the selected currently displayed information (S25). When the received terminal ID is different from the terminal ID of the selected display information (NO at S25), the sequence goes to step S29 without executing any particular process. When the received terminal ID is identical with the terminal ID of the selected currently displayed information (YES at S25), the received captured image is displayed so as to partially overlap with the currently displayed material image (display process (S27)).

The display process will be described with reference to FIG. 8. A background portion of the material image corresponding to the currently displayed information selected at step S23 (see FIG. 7) is detected (S41). As a method for detecting the background portion, for example, the following method can be used. An area of a predetermined size is selected from the material image. An image density of the selected area is specified for each pixel. A maximum value and a minimum value of the specified image density are extracted. A difference between the maximum value and the minimum value of the extracted image density is calculated. The calculated difference is determined as a change amount of the image density in the selected area. This process is executed on all the areas of the material image. An area in which the calculated change amount of the image density is relatively small is specified as the background portion on the material image.

The method for detecting the background portion is not limited to the above method. Another known method can be used instead.

After the background portion of the material image is specified (S41), the received captured image is displayed so as to overlap with the specified background portion (S43). The captured image may be suitably deformed (enlarged or reduced) according to an area of the specified background portion. The display process is ended, and the sequence returns to the image receiving process (see FIG. 7).

As shown in FIG. 7, a determination is made at step S29 whether or not the above process is executed on all pieces of the currently displayed information related to the material image stored in the display table 3121 (S29). When another piece of the currently displayed information related to the material image that has not been subject to the process remains (NO at S29), the sequence returns to step S23. After another piece of the currently displayed information is selected (S23), the above process is repeated. When the above process is executed on all pieces of the currently displayed information related to the material image (YES at S29), the captured image received at step S11 is displayed on the display 28 (S31). When the captured image whose file name is identical to the captured image displayed on the display 28 is received, that is when the file name of the received captured image is stored in the display table 3121, the currently displayed captured image is updated by the received captured image. The information about the display image and the terminal ID received at step S11 is stored in the display table 3121 (S33). A concrete storage method is the same as that at step S19. The sequence returns to step S11 so as to repeat the above process.

Figure 9:
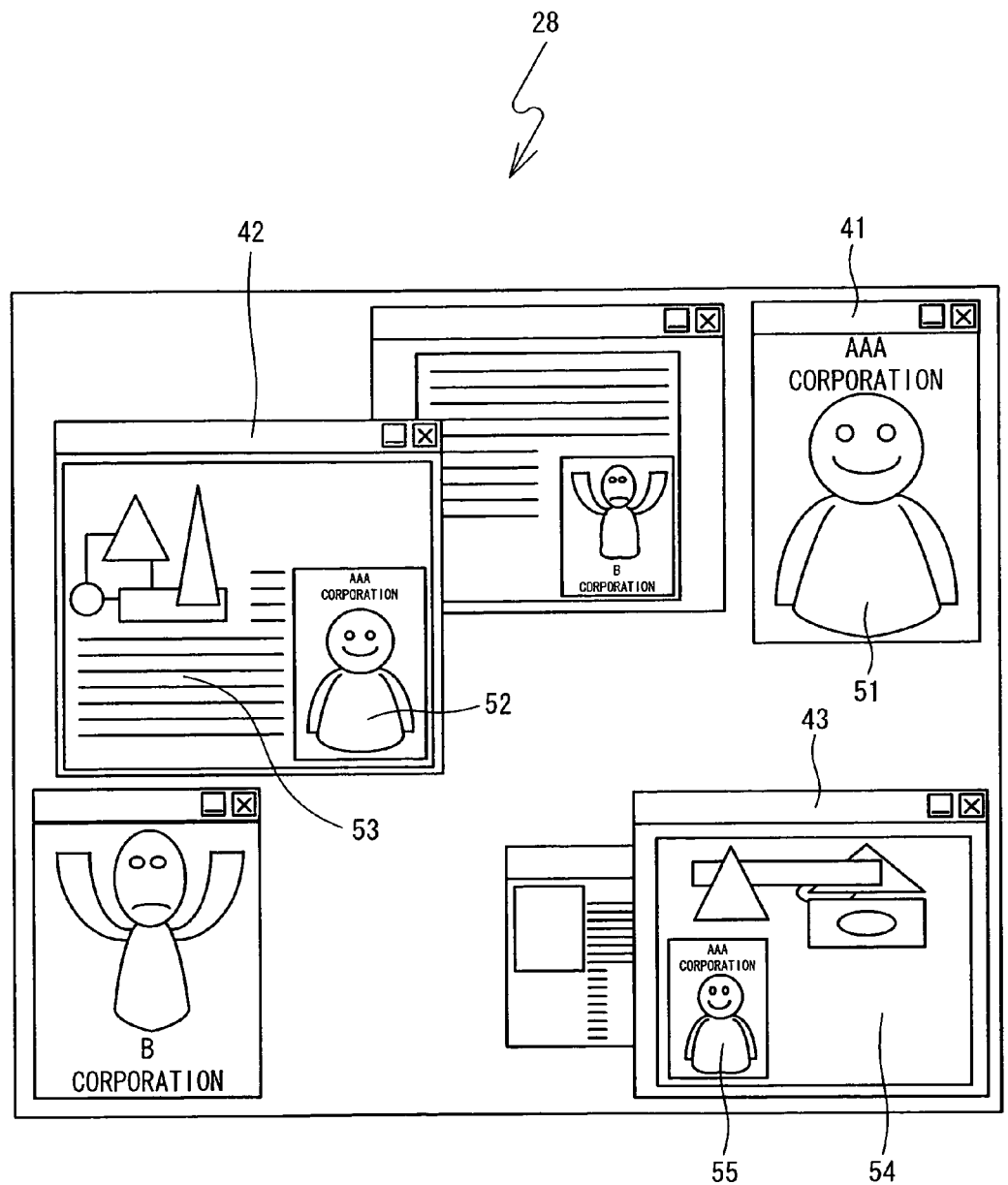
FIG. 9 is a diagram illustrating one example of a display screen.

One example of a display screen displayed on the display 28 based on the display table 3121 (see FIG. 5) will be described with reference to FIG. 9. In FIG. 9, a captured image 51 with a file name "FFFF.cif" is displayed on a window 41. A captured image 52 with a file name "FFFF.cif" is displayed on a window 42 to be overlapped with a background portion of a material image 53 with a file name "EEEE.doc". A captured image 55 with a file name "FFFF.cif" is displayed on a window 43 to be overlapped with a background portion of a material image 54 with a file name "DDDD.ppt".

In the example of FIG. 9, the display images may be displayed as follows. The captured image 51 is received from the communication terminal 4 (YES at S11, see FIG. 7). Since the material image displayed on the display 28 is not present (NO at S13, see FIG. 7), the captured image 51 is displayed on the display 28 (S17). The material images 53 and 54 are received from the communication terminal 4 (YES at S11, see FIG. 7). Since they are not captured images (NO at S15), the material images 53 and 54 are displayed on the display 28 (S17). The captured image 51 is transmitted repeatedly at constant cycles from the communication terminal 4 (S3, see FIG. 6). The captured image 51 is again received (YES at S11). The material images 53 and 54 are currently displayed on the display 28 (YES at S13). Therefore Background portions of the currently displayed material images 53 and 54 are detected (S41, see FIG. 8). The received captured images 52 and 53 are overlapped with the detected background portions (S43, see FIG. 8).

The active display process will be described with reference to FIG. 10. When the participant selects one of a plurality of the display images, the communication terminal 3 actively displays the selected display image. The communication terminal 3 identifies a communication terminal that has transmitted the actively displayed display image. The communication terminal 3 actively displays another display image received from the identified communication terminal.

Figure 10:
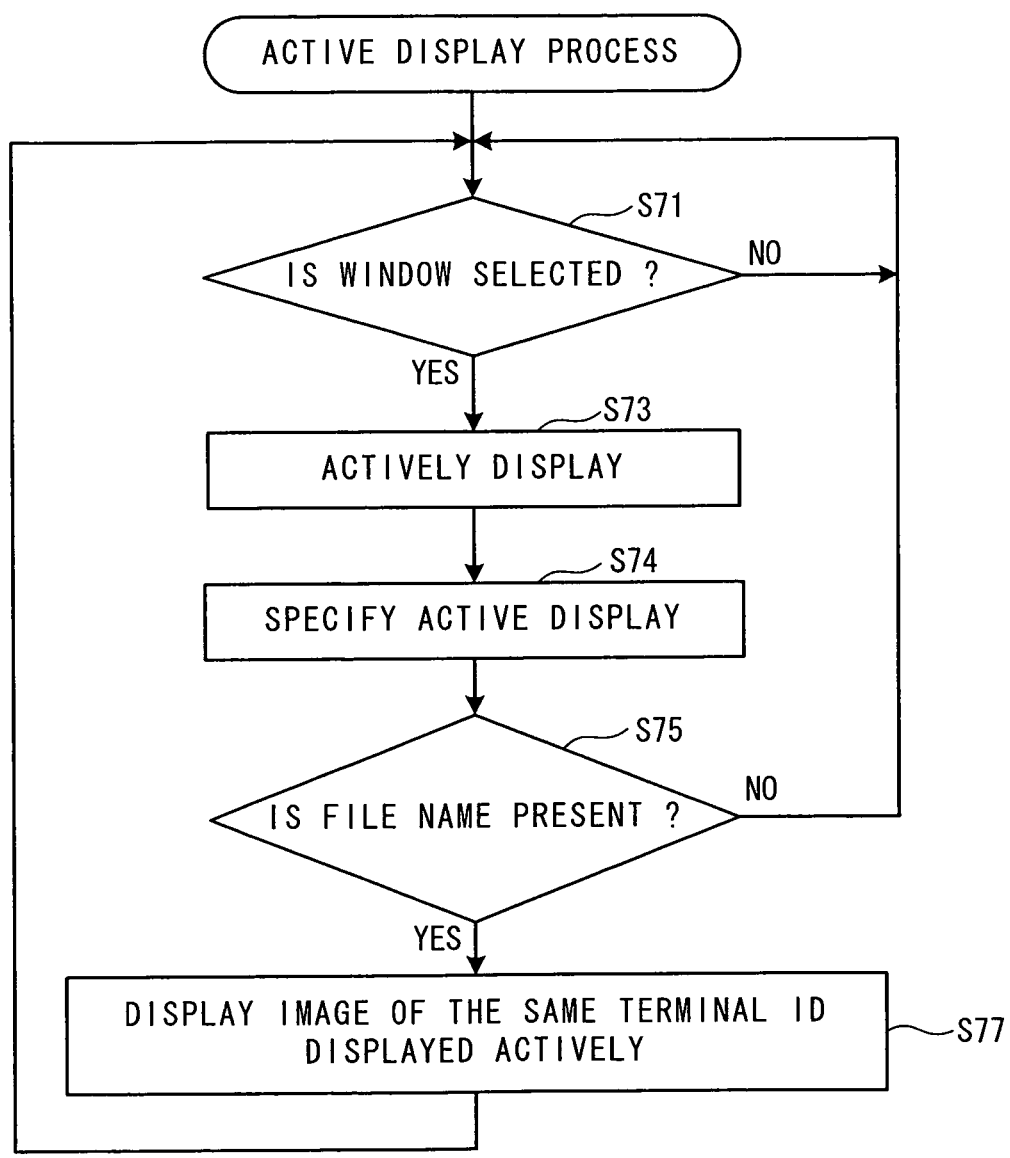
FIG. 10 is a flowchart illustrating an active display process.

As shown in FIG. 10, when the active display process is activated, a determination is made which display image displayed on the display 28 is selected (S71). The selection may be made via an operation of the mouse 27 or the keyboard 29. When a display image is not selected (NO at S71), the sequence returns to step S71. The operation is continuously monitored.

When any one of the display images is selected (YES at S71), the selected display image is brought into state that the display image is the target of the input or the operation. The display images other than the selected display image are brought into state that the display image is not the target of the input or the operation (S73). An active flag corresponding to the file name of the actively displayed display image (selected display image) in the display table 3121 is turned ON. Active flags corresponding to the file names of the non-actively displayed display images are turned OFF.

Reference is made to the display table 3121. The currently displayed information whose active flag is ON is selected (S74). A terminal ID of the currently displayed information selected is acquired. A determination is made whether or not a file name corresponding to a terminal ID identical to the acquired terminal ID is stored in the display table 3121 (S75). When the file name is not stored in the display table 3121 (NO at S75), the sequence returns to step S71. The above process is repeated.

When the file name corresponding to the acquired terminal ID is stored in the display table 3121 (YES at S75), the currently displayed display image identified by the file name is actively displayed (S77). The active flag corresponding to the file name of the actively displayed display image in the display table 3121 is turned ON. The active flags corresponding to the file names of the display images that are not actively displayed are turned OFF. The sequence re turns to step S71, and the above process is repeated.

The changing process will be described with reference to FIG. 11. On the communication terminal 3, a position of a captured image that is displayed by being overlapped with the material image can be moved.

Figure 11:
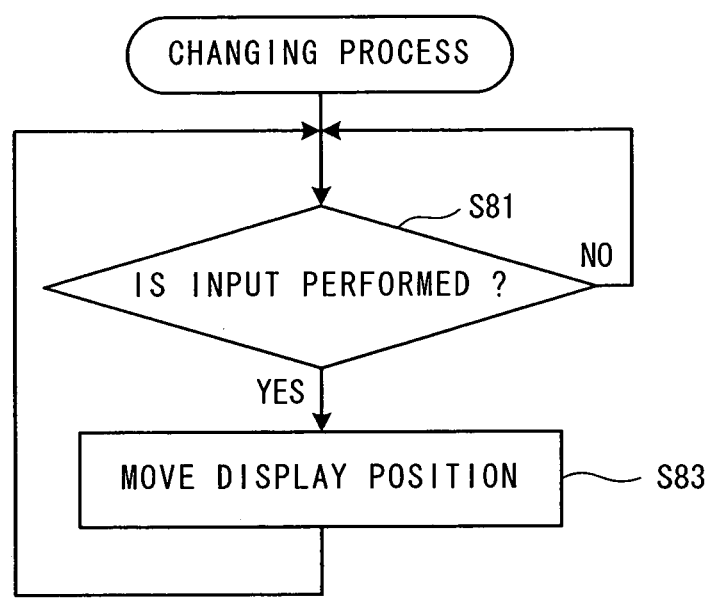
FIG. 11 is a flowchart illustrating a changing process.

As shown in FIG. 11, when the changing process is activated, a determination is made whether or not an instruction is input to move the captured image displayed by being partially overlapped with the material image displayed on the display 28 (S81). The input may be made via the mouse 27 or the keyboard 29. When the instruction is not input (NO at S81), the sequence returns to step S81. The operation is continuously monitored.

When the instruction to move the captured image is input (YES at S81), the captured image is moved to a specified position to be displayed based on the instruction (S83). The sequence returns to step S81, and the above process is repeated.

As described above, the communication terminal 3 displays the material images received from the communication terminals 4 to 6 on the display 28. The communication terminal 3 receives the captured images from the communication terminals 4 to 6. The communication terminal 3 displays the received captured images in a manner that they are partially overlapped with the display areas of the displayed material images. The participant who uses the communication terminal 3 can easily associate the material images with the other participants displayed as the captured image so as to recognize them.

The communication terminal 3 identifies the background portion of the displayed material image. The communication terminal 3 displays the captured image in a manner so as to overlap with the identified background portion. This may prevent the captured image from being overlapped with an important portion of the material image. On the communication terminal 3, the important portion of the material image can be prevented from being blocked by the captured image of the participant. The background portion can be identified by extracting a portion where the change amount of the image density is relatively small. The communication terminal 3, therefore, can securely identify the background portion of the material image.

The communication terminal 3 can move the display position of the captured image overlapped with the material image. When it is difficult for the participant to view the captured image because it is overlapped with the material image, the participant can change the display position of the captured image. The participant can satisfactorily maintain visibility of the material image.

When one of the display images transmitted from a communication terminal is actively displayed, the communication terminal 3 actively displays the other display images transmitted from the same communication terminal. The participant can easily recognize the display images transmitted from the same communication terminal.

The present disclosure is not limited to the above embodiment, and various modifications can be made. In the above embodiment, the communication terminal 3 displays the received captured image in a manner so as to overlap with the material image displayed on the display 28. The present disclosure is not limited to this method. The communication terminal 3 may receive a material image in a state that a captured image is displayed on the display 28. The communication terminal 3 may display the received material image in a manner so as to overlap with the currently displayed captured image. The communication terminal 3 may switch the display state between the state that the captured image is overlapped with the material image and the state that the material image is overlapped with the captured image by means of an operation via the mouse 27 or the keyboard 29.

In the above embodiment, the communication terminal 3 displays the captured image in a manner so as to overlap with the material image displayed on the display 28. The present disclosure is not limited to this method. The communication terminal 3 may display the captured image so that a display frame of the material image contacts with a display frame of the received captured image. In such case, in the display process (S27) of FIG. 7, the following process may be executed. Position information of the display frame of the material image displayed on the display 28 is specified. A display position of the captured image is determined based on the specified position information so that the display frame of the material image contacts with the display frame of the captured image. The captured image is displayed in the specified display position (S27). As a result, the captured image is displayed so that the display frame of the material image contacts with the display frame of the captured image. The participant can easily associate the material image with the captured image. The participant can easily associate the material images with the other participants displayed as the captured images so as to recognize them.

Figure 12:
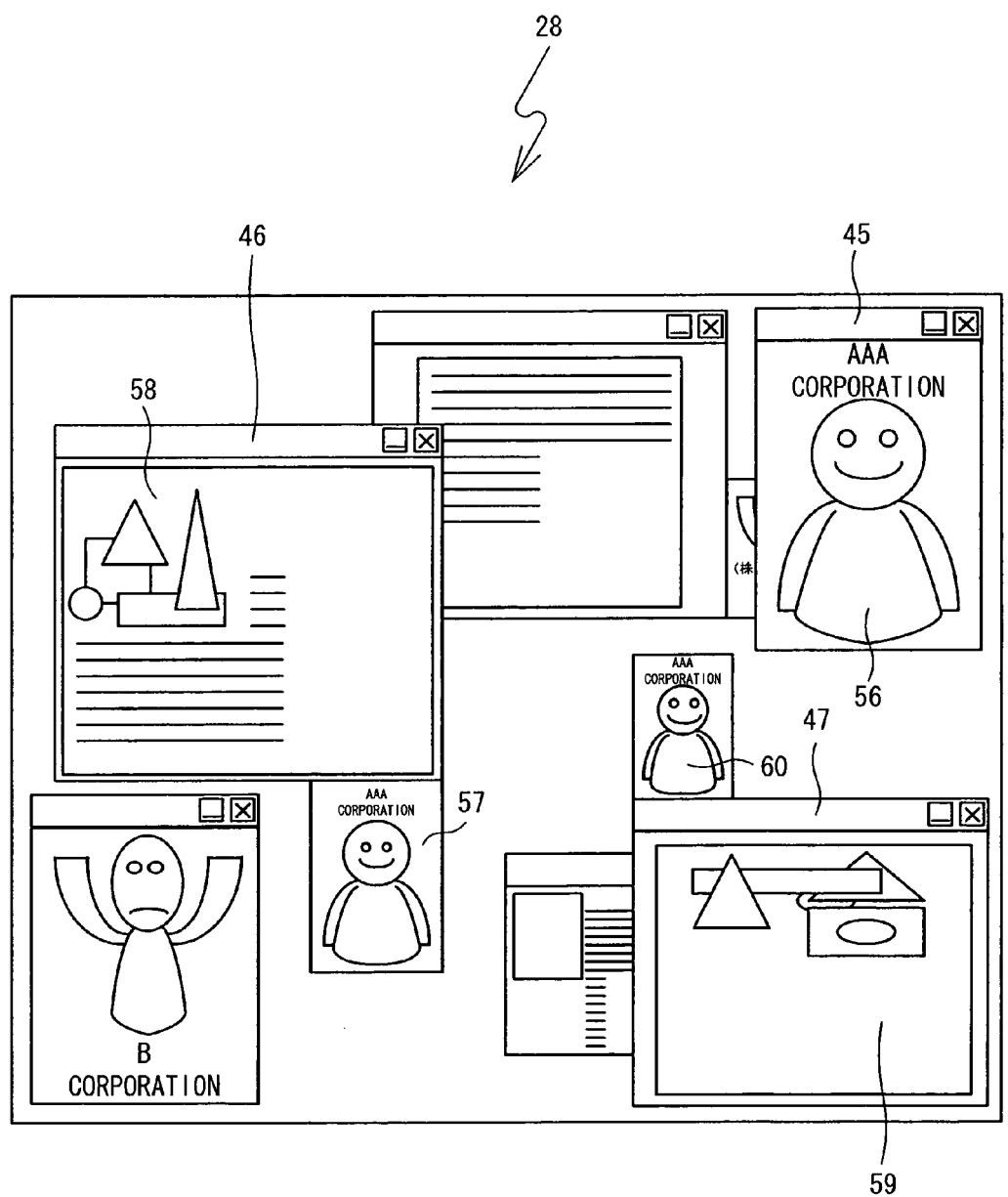
FIG. 12 is a diagram illustrating one example of the display screen.

One example of the display screen displayed on the display 28 based on the display table 3121 (see FIG. 5) will be described with reference to FIG. 12. A captured image 56 with a file name "FFFF.cif" is displayed on a window 45. A material image 58 with a file name "EEEE.doc" is displayed on a window 46. A display frame of the window 46 contacts with a display frame of a captured image 57 with a file name "FFFF.cif". A material image 59 with a file name "DDDD.ppt" is displayed on a window 47. A display frame of the window 47 contacts with a display frame of a captured image 60 with a file name "FFFF.cif".

In the image transmitting process described above (see FIG. 6), the communication terminal 3 transmits the acquired display image (the captured image or the material image) to the communication terminals 4 to 6 that have logged in the video conference (S3 and S6, see FIG. 6). In the image receiving process (see FIG. 7), the communication terminal 3 receives the display images transmitted from the other communication terminal devices 4 to 6 (S11, see FIG. 7). The present disclosure is not limited to this method, and another method may be adopted. A Multipoint Control Unit (MCU) that controls entire communication in the video conference may be connected to the network 2. In such case, in the image transmitting process (see FIG. 6), the communication terminal 3 may transmit the display image to the MCU. In the image receiving process (see FIG. 7), the communication terminal 3 may receive the display image from the MCU.

In the above embodiment, the communication terminal 3 displays the entire received captured image so as to overlap with the identified background portion of the material image. The present disclosure is not limited to this method. Modified examples of the present disclosure will be described below.

FIRST MODIFIED EXAMPLE

A first modified example of the present disclosure will be described with reference to FIGS. 13 and 14. In the first modified example, the communication terminal 3 extracts a person's facial portion from a received captured image. The communication terminal 3 displays the extracted facial portion so as to overlap with a background portion of a currently displayed material image. The participant who uses the communication terminal 3 can recognize the material image displayed that is overlapped with the person's facial portion of the person. The participant of the conference can easily associate the material image with the captured image.

The display process according to the first modified example will be described with reference to FIG. 13. The configuration of the video conference system 1, the electrical configurations of the communication terminals 3 to 6, the storage areas of the HDD 31, the image transmitting process the active display process, the changing process to be executed by the CPU 20, and the image receiving process excluding the display process are the same as the above. The description thereof is omitted or simplified below. When the application for carrying out the video conference is activated, the image receiving process is activated by the CPU 20. The display process is called by the image receiving process.

Figure 13:
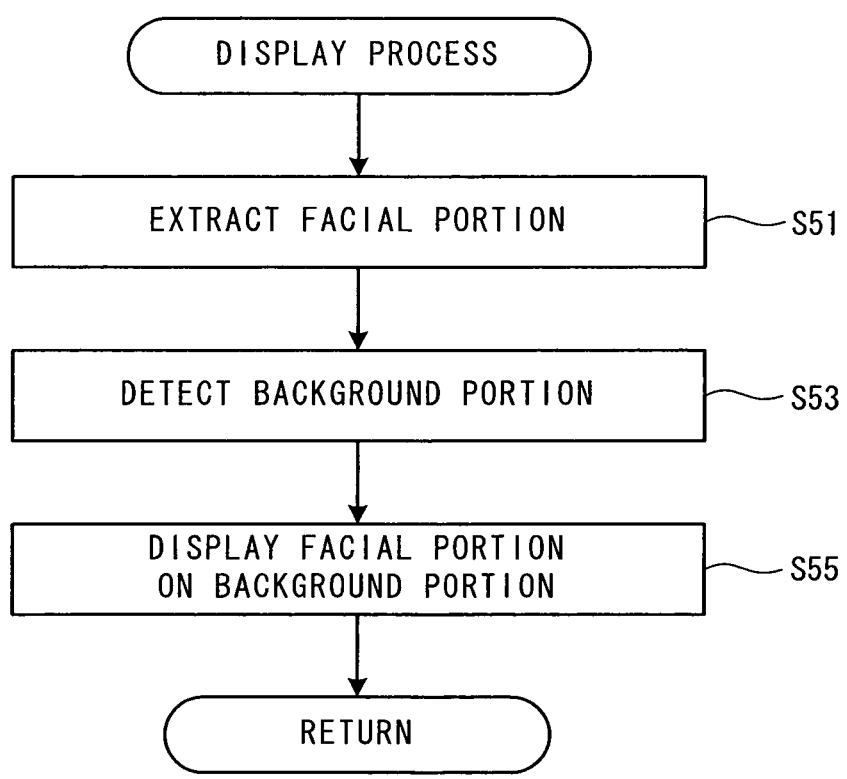
FIG. 13 is a flowchart illustrating the display process.
Figure 14:
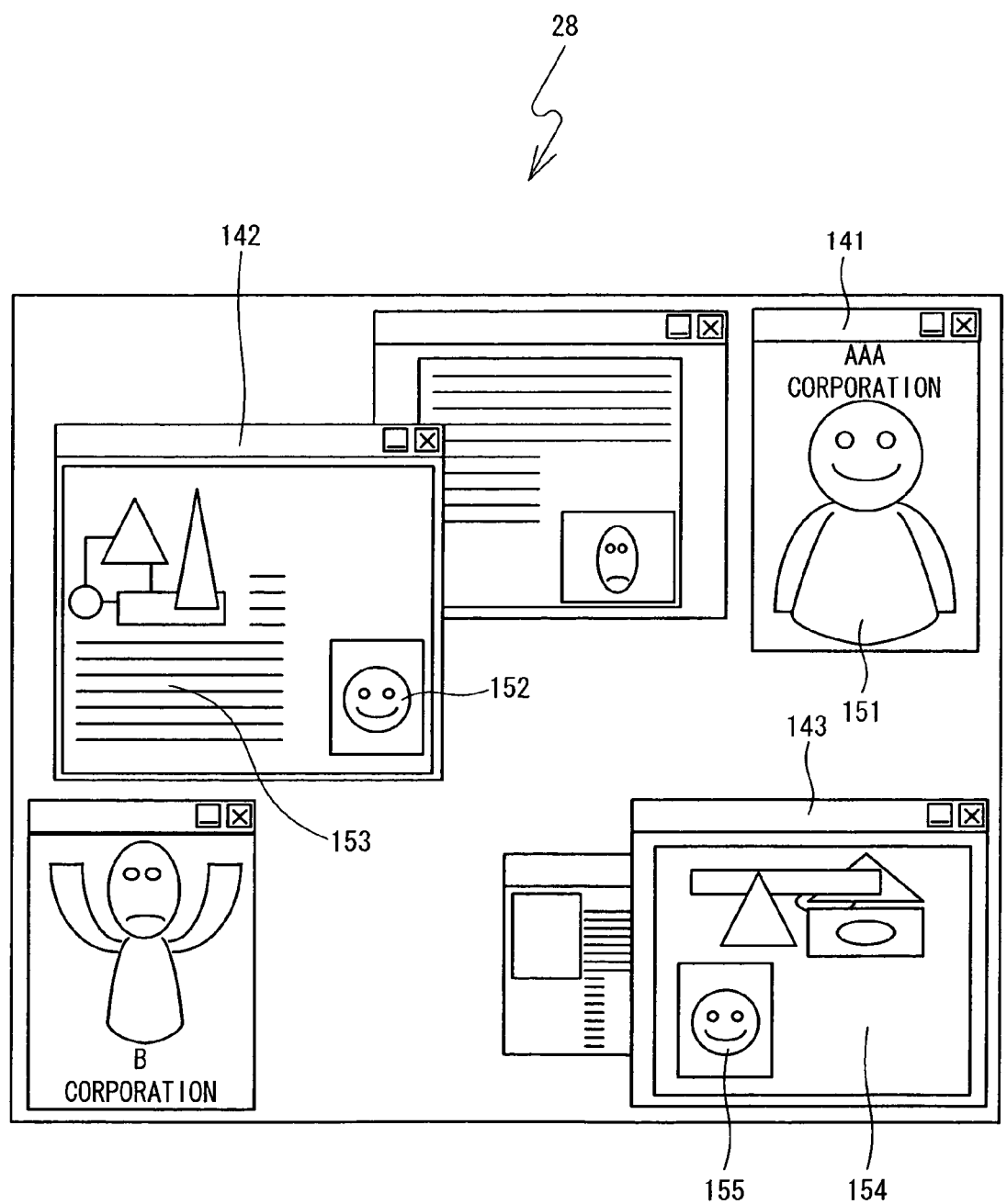
FIG. 14 is a diagram illustrating one example of the display screen.

As shown in FIG. 13, a person's facial portion is extracted from a received captured image (S51). The facial portion can be distinguished from the captured image by various known methods.

For example, the following method can be used. A color, a geometrical shape, a shading pattern, a movement and the like of a captured image can be extracted as parameters from the captured image. Reference is made to a database including the parameters of people's faces stored in the other information storage area 315 of the HDD 31 in advance. A pattern matching process is executed between the extracted parameters and the parameters of the people's faces stored in the database. The pattern matching process is executed according to combinations of a plurality of parameters as necessary. When the extracted parameters match satisfactorily to parameters of the people's faces stored in the database, a portion of the captured image corresponding to the people's faces is identified. The identified portion is recognized as a person's facial portion.

A background portion of the material image corresponding to the currently displayed information selected at step S23 (see FIG. 7) is detected (S53). As the method for detecting the background portion, the method similar to the detecting method at step S41 (see FIG. 8) can be used. The person's facial portion extracted at step S51 is clipped from the captured image. The extracted person's facial portion is displayed so as to overlap with the background portion detected from the material image (S55). The facial portion extracted from the captured image may be suitably deformed (enlarged or reduced) according to an area of the specified background portion. The display process is ended, and the sequence returns to the image receiving process (see FIG. 7).

The display screen displayed on the display 28 based on the display table 3121 (see FIG. 5) will be described with reference to FIG. 14. A captured image 151 with a file name "FFFF.cif" is displayed on a window 141. A material image 153 with a file name "EEEE.doc" is displayed on a window 142. An image 152 of the person's facial portion extracted from the captured image with the file name "FFFF.cif" is displayed so as to overlap with a background portion of the material image 153. A material image 154 with a file name "DDDD.ppt" is displayed on a window 143. An image 155 of the person's facial portion extracted from the captured image with the file name "FFFF.cif" is displayed so as to overlap with a background portion of the material image 154.

In the first modified example, the communication terminal 3 extracts the person's facial portion from the captured image. The communication terminal 3 displays the image of the extracted person's facial portion so as to overlap with the background portion of the displayed material image. The participant who uses the communication terminal 3 can easily associate the material images with the participants who use the communication terminals that have transmitted the material images so as to recognize them.

SECOND MODIFIED EXAMPLE

A second modified example of the present disclosure will be described with reference to FIGS. 15 and 16. In the second modified example, the communication terminal 3 extracts from a received captured image a characteristic portion that can specify information relating to a participant of conference. The communication terminal 3 displays the extracted characteristic portion so as to overlap with the background portion of the currently displayed material image. The participant who uses the communication terminal 3 can view the material image with which the characteristic portion is overlapped. As a result, the participant can easily associate the material images with affiliations or the like of the users of the communication terminals that have transmitted the material images.

The display process according to the second modified example will be described with reference to FIG. 15. The configuration of the video conference system 1, the electrical configurations of the communication terminals 3 to 6, the storage areas of the HDD 31, the image transmitting process, the active display process, the changing process, and the image receiving process excluding the display process to be executed by the CPU 20 are the same as the above. The description thereof is omitted or simplified below. When the application for carrying out the video conference is activated, the image receiving process is activated by the CPU 20. The display process is called by the image receiving process.

Figure 15:
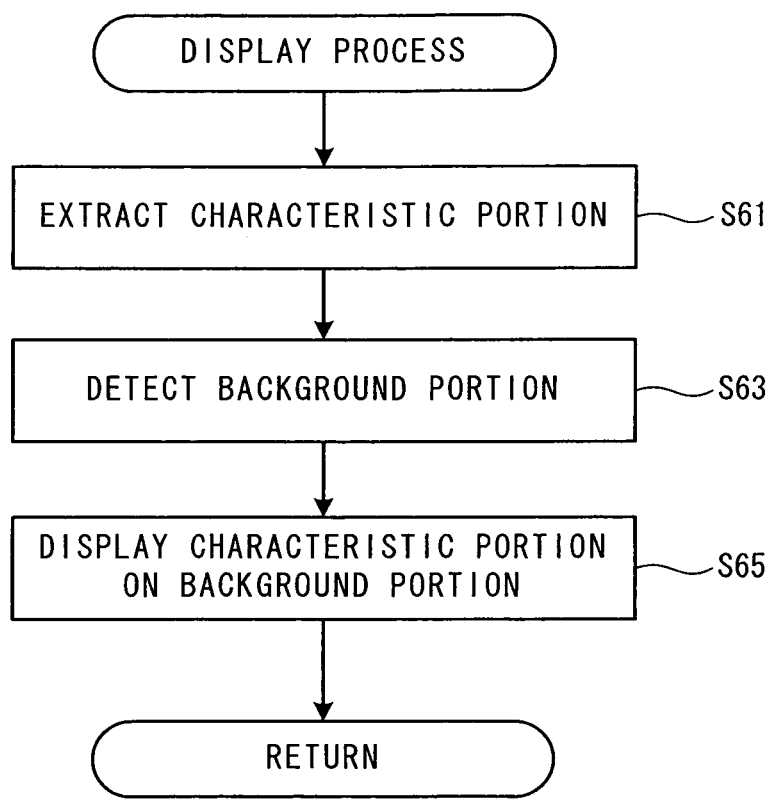
FIG. 15 is a flowchart illustrating the display process.
Figure 16:
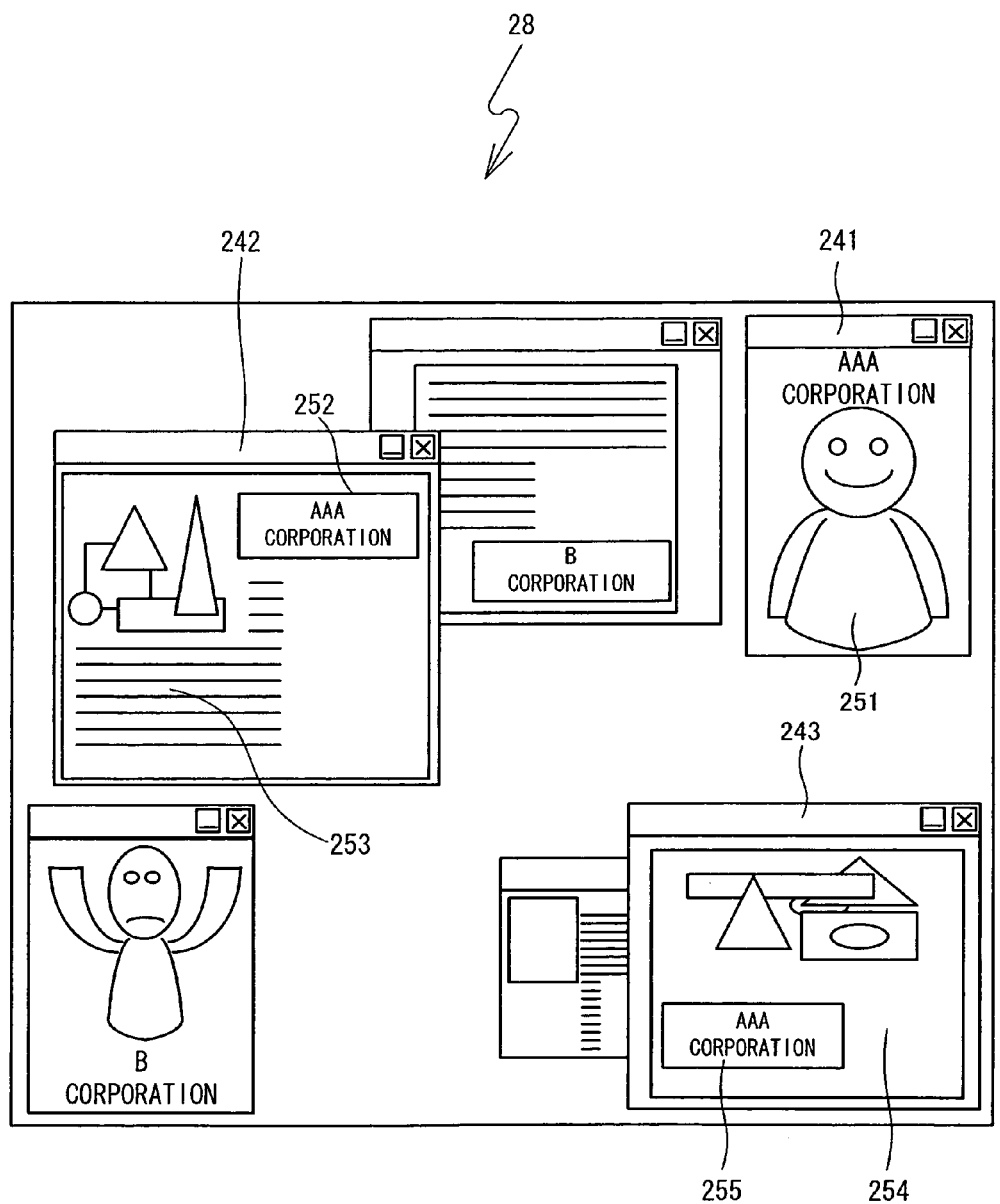
FIG. 16 is a diagram illustrating one example of the display screen.

As shown in FIG. 15, a characteristic portion is extracted from a received captured image (S61). As the characteristic portion, a logo or the like of a company to which each participant of the conference belongs may be used. The characteristic portion can be extracted by various known methods.

For example, the following method can be used. An edge of the captured image is detected. Reference is made to image data of characteristic portions stored in the another information storage area 315 of the HDD 31 in advance. A pattern matching process is executed between a pattern of an edge in the captured image obtained by the edge detection and a pattern of an edge of the image data of the stored characteristic portion. When both of the patterns are satisfactorily matched with each other, the portion corresponding to the matched pattern is identified from the captured image. The identified portion is recognized as the characteristic portion.

A background portion of the material image corresponding to the currently displayed information selected at step S23 (see FIG. 7) is detected (S63). As the method for detecting the background portion, the method similar to the detecting method at step S41 (see FIG. 8) can be used. The characteristic portion extracted at step S61 is clipped from the captured image. The clipped characteristic portion is displayed so as to overlap with the detected background portion (S65). The characteristic portion extracted from the captured image may be suitably deformed (enlarged or reduced) according to the area of the specified background portion. The display process is ended, and the sequence returns to the image receiving process (see FIG. 7).

The display screen displayed on the display 28 based on the display table 3121 (see FIG. 5) will be described with reference to FIG. 16. A captured image 251 with a file name "FFFF.cif" is displayed on a window 241. A material image 253 with a file name "EEEE.doc" is displayed on a window 242. An image 252 of a characteristic portion "AAA Corporation" extracted from the captured image with the file name "FFFF.cif" is displayed so as to overlap with the background portion of the material image 253. A material image 254 with a file name "DDDD.ppt" is displayed on a window 243. An image 255 of a characteristic portion "AAA corporation" extracted from the captured image with the file name "FFFF.cif" is displayed so as to overlap with a background portion of the material image 254.

In the second modified example, the communication, terminal 3 extracts the characteristic portion of the captured image. The communication terminal 3 displays the image of the extracted characteristic portion so as to overlap with the background portion of the displayed material image. The participant who uses the communication terminal 3 can more easily associate the material images with affiliations or the like of the people using the communication terminals that have transmitted the material images so as to recognize them.

In the above embodiment the communication terminal 3 displays the received captured image, so as to overlap with the material image displayed on the display 28. The present disclosure is not limited to this method. The communication terminal 3 may display the received captured image on the display 28 without overlapping with the material image. The communication terminal 3 may display a material image displayed before displaying the captured image, so as to overlap with the displayed captured image. The communication terminal 3 may display the material image displayed before displaying the captured image so that its display frame contacts with a display frame of the displayed captured image. In such case, in the display process of FIG. 7 (S27), the received captured image is moved on the display 28. The displayed material image is displayed so as to overlap with, the captured image. In another manner, the material image is moved so that the display frame of the displayed material image contacts with the display frame of the displayed captured image.

While the invention has been described in connection with various exemplary structures and illustrative embodiments, it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:

1. A communication terminal device comprising:
    a processor; and
    a memory configured to store computer-readable instructions that, when executed by the processor, cause the communication terminal device to:
    receive a material image and corresponding first identification information transmitted from a communication terminal device via a network, the material image being an image of a material, and the first identification information identifying the communication terminal device that has transmitted the material image;
    receive a captured image and corresponding second identification information transmitted from a communication terminal device via the network, the captured image being an image captured by a camera and different from the material image, and the second identification information identifying the communication terminal device that has transmitted the captured image;
    determine whether the material image and the captured image have been transmitted from the same communication terminal device by comparing the first identification information with the second identification information; and
    display, when the result of the determining indicates that the material image and the captured image have been transmitted from the same communication terminal device, the material image and the captured image on a display device at positions at which at least a part of the captured image overlaps with at least a part of the material image or at positions at which an outer edge of the part of the captured image abuts an outer edge of the material image.

2. The communication terminal device according to claim 1, wherein the memory is further configured to store computer-readable instructions that, when executed by the processor, cause the communication terminal device to:
    extract a predetermined portion from the received captured image,
    wherein the displaying the material image and the captured image comprises displaying the material image and the extracted predetermined portion at the positions at which the extracted predetermined portion overlaps with at least the part of the material image or at the positions at which an outer edge of the extracted predetermined portion abuts the outer edge of the material image.

3. The communication terminal device according to claim 2, wherein the extracting the predetermined portion comprises extracting a facial portion of a person as the predetermined portion from the received captured image.

4. The communication terminal device according to claim 2, wherein the memory is further configured to:
    store a shape of the predetermined portion, and
    wherein the extracting the predetermined portion comprises extracting, from the received captured image, a portion having a shape that matches with the shape of the predetermined portion stored in the memory as the predetermined portion.

5. The communication terminal device according to claim 1, wherein the memory is further configured to store computer-readable instructions that, when executed by the processor, cause the communication terminal device to:
    identify a background portion of the material image,
    wherein the displaying the material image and the captured image comprises displaying the material image and the captured image at the positions at which the at least the part of the captured image overlaps with at least a part of the identified background portion.

6. The communication terminal device according to claim 5,
    wherein the identifying the background portion comprises identifying, as the background portion, an area of the material image in which a change amount of an image density is smaller than an image density of another area of the material image.

7. The communication terminal device according to claim 1,
    wherein the displaying the material image and the captured image comprises changing, when the material image and the captured image are displayed at the positions at which the at least the part of the captured image overlaps with at least the part of the material image, the position of the captured image based on an instruction input via an input device.

8. The communication terminal device according to claim 1,
    wherein the memory is further configured to store:
    when the material image and the captured image are displayed at the positions at which the at least the part of the captured image overlaps with at least the part of the material image or at the positions at which the outer edge of the part of the captured image abuts the other edge of the material image, and when another captured image is separately displayed in another area different from the displayed material image, displayed captured image and the separately displayed captured image associated with each other;
    wherein the memory is further configured to store computer-readable instructions that, when executed by the processor, cause the communication terminal device to:
    identify an active image that is an image currently displayed on the display device and is a target of an input or an operation by a user;
    identify, when at least one of the displayed captured image and the separately displayed captured image are identified as the active image, at least one of the displayed captured image and the separately displayed captured image associated with the identified active image with reference to the memory; and bring the at least one of the identified displayed captured image and the identified separately displayed captured image into a state that the at least one of the identified displayed captured image and the identified separately displayed captured image are the target of the input or the operation.

9. The communication terminal device according to claim 1, wherein:
the receiving the material image and the corresponding first identification information comprises receiving a plurality of material images and corresponding first identification information that are respectively transmitted from a plurality of communication terminal devices,
the receiving the captured image and the corresponding second identification information comprises receiving a plurality of captured images and corresponding second identification information that are respectively transmitted from a plurality of communication terminal devices,
the determining comprises determining whether one of the material images and one of the captured images have been transmitted from the same communication terminal device by comparing each piece of the first identification information with each piece of the second identification information, and
the displaying comprises:
displaying, when the result of the determining indicates that the one of the material images and the one of the captured images have been transmitted from the same communication terminal device, the one of the material images and the one of the captured images on the display device transmitted from the same communication terminal device at positions at which at least a part of the one of the captured images overlaps with at least a part of the one of the material images or at positions at which an outer edge of the part of the one of the captured images abuts an outer edge of the one of the material images; and
displaying one or more of the material images and one or more of the captured images that have not been transmitted from the same communication terminal device in an unlimited manner.

10. The communication terminal device according to claim 1,
wherein the memory is further configured to store computer-readable instructions that, when executed by the processor, cause the communication terminal device to:
display the material image on the display device when the material image and the first identification information is received; and
determine, when the captured image and the second identification information is received, whether the material image is already displayed on the display device or not,
wherein the displaying the material image and the captured image comprises displaying the material image and the captured image when it is determined that the material image is already displayed.

11. A display control method to be performed in a communication terminal device connectable with a network, comprising the steps of:

receiving a material image and corresponding first identification information transmitted from a communication terminal device via the network, the material image being an image of a material, and the first identification information identifying the communication terminal device that has transmitted the material image;
receiving a captured image and corresponding second identification information transmitted from a communication terminal device via the network, the captured image being an image captured by a camera and different from the material image, and the second identification information identifying the communication terminal device that has transmitted the captured image;
determining whether the material image and the captured image have been transmitted from the same communication terminal device by comparing the first identification information with the second identification information; and
displaying, when the result of the determining indicates that the material image and the captured image have been transmitted from the same communication terminal device, the material image and the captured image on a display at positions at which at least a part of the captured image overlaps with at least a part of the material image or at positions at which an outer edge of the part of the captured image abuts an outer edge of the material image.

12. A non-transitory computer-readable medium storing a display control program of a communication terminal device, the display control program comprising computer-readable instructions that cause the communication terminal device to execute steps of:
receiving a material image and corresponding first identification information transmitted from a communication terminal device via the network, the material image being an image of a material, and the first identification information identifying the communication terminal device that has transmitted the material image;
receiving a captured image and corresponding second identification information transmitted from a communication terminal device via the network, the captured image being an image captured by a camera and different from the material image, and the second identification information identifying the communication terminal device that has transmitted the captured image;
determining whether the material image and the captured image have been transmitted from the same communication terminal device by comparing the first identification information with the second identification information; and
displaying, when the result of the determining indicates that the material image and the captured image have been transmitted from the same communication terminal device, the material image and the captured image on a display device at positions at which at least a part of the captured image overlaps with at least a part of the material image or at positions at which an outer edge of the part of the captured image abuts an outer edge of the material image.

* * * * *